(12) United States Patent
Johns

(10) Patent No.: US 11,374,966 B2
(45) Date of Patent: Jun. 28, 2022

(54) ROBUST AND TRANSPARENT PERSISTENCE OF TAINT INFORMATION TO ENABLE DETECTION AND MITIGATION OF INJECTION ATTACKS

(71) Applicant: SAP SE, Walldorf (DE)

(72) Inventor: Martin Johns, Karlsruhe (DE)

(73) Assignee: SAP SE, Walldorf (DE)

( * ) Notice: Subject to any disclaimer, the term of this patent is extended or adjusted under 35 U.S.C. 154(b) by 173 days.

(21) Appl. No.: 16/218,752

(22) Filed: Dec. 13, 2018

(65) Prior Publication Data
US 2020/0195686 A1 Jun. 18, 2020

(51) Int. Cl.
*G06F 16/245* (2019.01)
*G06F 16/25* (2019.01)
*G06F 16/248* (2019.01)
*G06F 16/22* (2019.01)
*H04L 9/40* (2022.01)

(52) U.S. Cl.
CPC ........ *H04L 63/1466* (2013.01); *G06F 16/221* (2019.01); *G06F 16/245* (2019.01); *G06F 16/248* (2019.01); *G06F 16/252* (2019.01)

(58) Field of Classification Search
None
See application file for complete search history.

(56) References Cited

U.S. PATENT DOCUMENTS

| | | | |
|---|---|---|---|
| 8,381,192 B1 | 2/2013 | Drewry et al. | |
| 8,429,409 B1 | 4/2013 | Wall et al. | |
| 8,555,355 B2 | 10/2013 | Rathbun | |
| 8,694,784 B1 | 4/2014 | Lekies et al. | |
| 9,131,382 B1 | 9/2015 | Johns | |
| 9,535,750 B1 | 1/2017 | Wilkes et al. | |
| 2007/0016949 A1 | 1/2007 | Dunagan | |
| 2010/0125737 A1 | 5/2010 | Kang | |
| 2011/0126010 A1 | 5/2011 | Kim et al. | |
| 2011/0185406 A1 | 7/2011 | Hirson et al. | |
| 2011/0185427 A1 | 7/2011 | Aciicmez et al. | |
| 2011/0314337 A1 | 12/2011 | Sinha et al. | |
| 2012/0144461 A1 | 6/2012 | Rathbun | |
| 2013/0086676 A1 | 4/2013 | Chess et al. | |
| 2013/0318056 A1 | 11/2013 | Lekies et al. | |
| 2014/0041023 A1 | 2/2014 | Lekies et al. | |
| 2014/0047538 A1 | 2/2014 | Scott et al. | |
| 2014/0101447 A1 | 4/2014 | Lekies et al. | |

(Continued)

OTHER PUBLICATIONS

Davis et al., "DBTaint: Cross-Application Information Flow Tracking via Databases", 2010 (Year: 2010).*

(Continued)

*Primary Examiner* — Dawaune A Conyers
(74) *Attorney, Agent, or Firm* — Fish & Richardson P.C.

(57) ABSTRACT

Methods, systems, and computer-readable storage media for receiving, by a database connector having a taint extension, a SQL request from an application, sending, by the taint extension, the SQL request to a SQL parser, receiving, by the taint extension, a structural representation of the SQL request from the SQL parser, adding, by the taint extension, taint information corresponding to data within the SQL request to provide an enhanced SQL statement, and transmitting, by the database connector, the enhanced SQL statement to a database for storing the taint information with the data.

17 Claims, 7 Drawing Sheets

(56) References Cited

U.S. PATENT DOCUMENTS

| | | |
|---|---|---|
| 2014/0337760 A1 | 11/2014 | Heinrich et al. |
| 2015/0067853 A1 | 3/2015 | Amrutkar et al. |
| 2015/0121533 A1* | 4/2015 | Gluck .................. G06F 11/3476 726/25 |
| 2015/0304337 A1* | 10/2015 | Nguyen-Tuong ..... G06F 40/169 726/1 |
| 2015/0309813 A1 | 10/2015 | Patel |
| 2015/0341385 A1 | 11/2015 | Sivan et al. |
| 2017/0318045 A1* | 11/2017 | Johns .................. H04L 63/1433 |
| 2018/0025161 A1 | 1/2018 | Gauthier et al. |
| 2020/0195687 A1 | 6/2020 | Johns |

OTHER PUBLICATIONS

Nethercote et al., "How to Shadow Every Byte of Memory Used by a Program", 2007 (Year: 2007).*

Orso et al., Using positive tainting and syntax-aware evaluation to Counter SQL injection attacks, 2006 (Year: 2006).*

Non-Final office action issued in United States U.S. Appl. No. 16/218,732 dated Jun. 25, 2020, 11 pages.

Final Office Action issued in United States U.S. Appl. No. 16/218,732 dated Jun. 4, 2021, 23 pages.

Non-Final Office Action issued in United States U.S. Appl. No. 16/218,732 dated Oct. 13, 2021, 16 pages.

U.S. Appl. No. 13/928,872, filed Jun. 27, 2013, Martin Johns.

U.S. Appl. No. 13/959,951, filed Aug. 6, 2013, Johns et al.

U.S. Appl. No. 15/882,043, filed Jan. 29, 2018, Spiegel et al.

Non-Final Office Action issued in U.S. Appl. No. 16/218,732 dated Oct. 13, 2021, 16 pages.

Pan et al., "Taint Inference for Cross-Site Scripting in Context of URL Rewriting and HTML Sanitization." ETRI Journal 38.2, Apr. 2016, 376-386, 11 pages.

Zhu et al., "TaintEraser: Protecting sensitive data leaks using application-level taint tracking." ACM SIGOPS Operating Systems Review 45.1, Feb. 2011, 142-154, 13 pages.

* cited by examiner

| ID | Name | City |
|---|---|---|
| 1 | Max | Cologne |
| 2 | Tim | Bern |
| 3 | Bernd | Berlin |

| ID | Name | City |
|---|---|---|
|  | Name | City |
|  | 111 | 2222222 |
|  | 111 | 1111 |
|  | 22222 | 2222222 |

*FIG. 3A*

| ID | Name | City |
|---|---|---|
| 1 \| 0 | Max \| 111 | Cologne \| 2222222 |
| 2 \| 0 | Tim \| 111 | Bern \| 1111 |
| 3 \| 0 | Bernd \| 22222 | Berlin \| 2222222 |

*FIG. 3B*

| ID | Name | City |
|---|---|---|
| 1 | Max | Cologne |
| 2 | Tim | Bern |
| 3 | Bernd | Berlin |

| ID | Name | City |
|---|---|---|
| 0 | 111 | 2222222 |
| 0 | 111 | 1111 |
| 0 | 22222 | 2222222 |

*FIG. 3C*

ROBUST AND TRANSPARENT PERSISTENCE OF TAINT INFORMATION TO ENABLE DETECTION AND MITIGATION OF INJECTION ATTACKS

BACKGROUND

Malicious users use attacks to disrupt operations, and/or access information. Example attacks can include injection attacks, such as cross-site scripting (XSS), and SQL injection. Data tainting has been a potent measure for detecting, and mitigating injection attacks. Data tainting (also referred to as taint checking) includes associating data that is to be processed with taint information (e.g., character string) that indicates whether the respective data is potentially harmful (e.g., presents a potential security risk). In some instances, the taint information is propagated to any other data that is derived from the potentially tainted data.

However, taint information is irrevocably lost as soon as the tainted data leaves the taint-aware runtime. This is especially problematic, when tainted data is persisted in an application's database, a code pattern that is ubiquitous in modern applications, leading to security problems such as stored XSS or second order code injection.

SUMMARY

Implementations of the present disclosure are directed to data tainting. More particularly, implementations of the present disclosure are directed to persistence of taint information.

In some implementations, actions include receiving, by a database connector having a taint extension, a SQL request from an application, sending, by the taint extension, the SQL request to a SQL parser, receiving, by the taint extension, a structural representation of the SQL request from the SQL parser, adding, by the taint extension, taint information corresponding to data within the SQL request to provide an enhanced SQL statement, and transmitting, by the database connector, the enhanced SQL statement to a database for storing the taint information with the data. Other implementations of this aspect include corresponding systems, apparatus, and computer programs, configured to perform the actions of the methods, encoded on computer storage devices.

These and other implementations can each optionally include one or more of the following features: actions further includes receiving, by the database connector, a query result, processing, by the taint extension, the query result to combine taint meta-data with one or more string values to provide a taint-aware query result, and returning the taint-aware query result to the application; the SQL request includes a write statement, and in response, unfolding is performed to separate the data and the taint information; the SQL request includes a read statement, and in response, folding is performed to combine the data and the taint information; the taint extension reserializes the data and the taint information to provide the enhanced SQL query; the taint information is stored within one of shadow tables, and shadow columns within the database; the database connector comprises an application programming interface (API).

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 3A-3C depict example strategies for persisting tain information into relational databases.

Like reference symbols in the various drawings indicate like elements.

DETAILED DESCRIPTION

Figure 1:
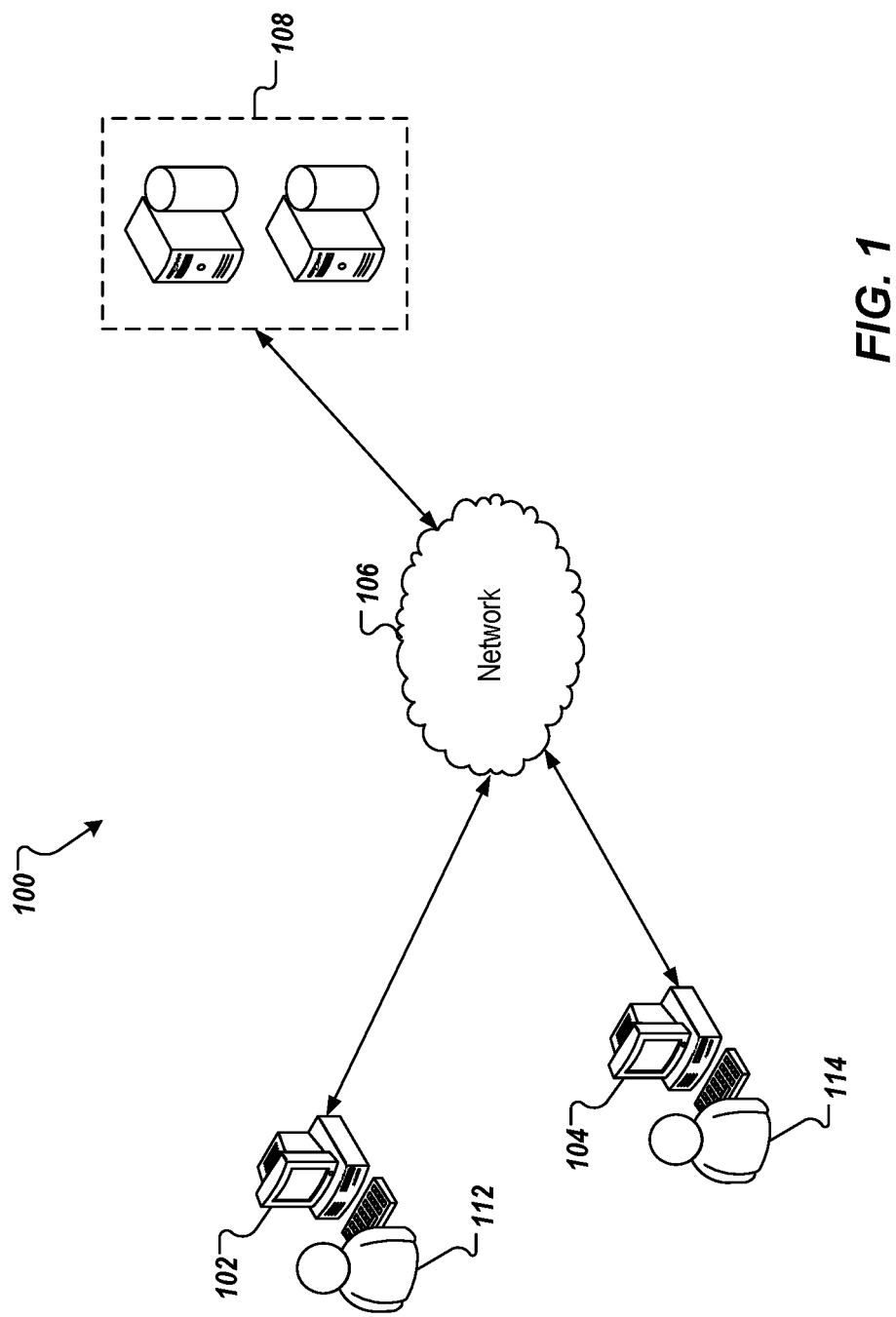
FIG. 1 depicts an example architecture that can be used to execute implementations of the present disclosure.

Implementations of the present disclosure are directed to data tainting. More particularly, implementations of the present disclosure are directed to persistence of taint information. Implementations can include actions of receiving, by a database connector having a taint extension, a SQL request from an application, sending, by the taint extension, the SQL request to a SQL parser, receiving, by the taint extension, a structural representation of the SQL request from the SQL parser, adding, by the taint extension, taint information corresponding to data within the SQL request to provide an enhanced SQL statement, and transmitting, by the database connector, the enhanced SQL statement to a database for storing the taint information with the data.

To provide further context for implementations of the present disclosure, and as introduced above, malicious users use attacks to disrupt operations, and/or access information. Example attacks can include injection attacks, such as cross-site scripting (XSS), and SQL injection. Data tainting has been a potent measure for detecting, and mitigating injection attacks. Data tainting (also referred to as taint checking) includes associating data that is to be processed with taint information (e.g., character string) that indicates whether the respective data is potentially harmful (e.g., presents a potential security risk). In some instances, the taint information is propagated to any other data that is derived from the potentially tainted data. However, taint information is irrevocably lost as soon as the tainted data leaves the taint-aware runtime. This is especially problematic, when tainted data is persisted in an application's database, a code pattern that is ubiquitous in modern applications, leading to security problems such as stored XSS or second order code injection.

To provide further context for implementations of the present disclosure, a broad class of string-based injection attacks include, without limitation, XSS, SQL injection, path traversals, and operating system (OS) command injection. Such string-based injection attacks share a set of common characteristics. For example, each is caused by the circumstance that a vulnerable application creates computer code (e.g., coding that will be parsed and interpreted by a program) using untrusted strings. As another example, strings can be injected by an attacker through a so-called source. The string-to-code transformation is done through an application programming interface (API). Example APIs include, without limitation, a SQL connector to a database, and an interface to data object model (DOM), a so-called sink. The source and the sink are connected through a direct data-flow contained in the vulnerable program.

Data tainting for detection and mitigation of injection attacks includes attaching provenance meta-data (taint information) to all string values that are processed by the application. This meta-data documents the source, from which the data was originally received. During the lifetime of the data, the taint information is preserved and propagated in such a form that the binding between the string data and the taint data is robustly preserved, even if the string data is operated on (e.g., through substring, and/or regular expression (RegEx) operations). When a data string reaches a security sensitive API (a sink), the API can verify that the tainted data (i.e., attacker-injected data) has no security impact on the API call (i.e., through changing the syntactic/semantic structure of a code statement).

The taint meta-data can be arbitrarily sophisticated. Studies have shown that numerical identifiers representing a corresponding taint source (e.g., the HTTP request's query) is sufficient for vulnerability detection and mitigation. In the context of the present disclosure, and without limitation, recorded taint meta-data (taint information) is provided as an integer value for each character in the tainted data string. For example:

|  | Taint-Aware String | | | | |
| --- | --- | --- | --- | --- | --- |
| Character Array | H | E | L | L | O |
| Taint Flags per Character | 1 | 1 | 0 | 0 | 1 |

Example Taint-Aware String

As introduced above, the taint information can be lost as a result of data persistence. More particularly, as long as the tainted data is processed within the confines of the taint-aware language runtime, the gapless preservation of the taint information is guaranteed. However, every non-trivial application utilizes storage options, such as databases, for persisting data between usage-sessions. As soon as tainted data leaves the taint-aware run-time, the enhanced string representation is re-serialized into a purely character-based string representation. Consequently, all taint information is lost and not persisted along with the actual data. If in a subsequent usage session, data is retrieved from the persistence layer (e.g., the database), this data carries no taint information, regardless of its taint state before being stored process. In this manner, attacker-injected strings could reenter the application unnoticed, and cause injection attacks (e.g., XSS).

In view of the above context, implementations of the present disclosure enable taint-aware applications to store taint information along with the original string-data. In accordance with implementations, storage of the taint information does not require any changes to the original code base of the application, and is applicable by any relational databases (e.g., databases that utilize SQL as their query language). In some implementations, a practical SQL-to-SQL rewriting technique is used, in which the application's original SQL queries are automatically transformed into equivalent SQL queries that handle taint information at the database layer. The transformation preserves semantics of the original SQL query. In some implementations, the transformation is performed within a wrapper of the framework's original database connector. The enhanced connector rewrites the SQL query, and simultaneously conducts the transformation between the run-time's taint-aware strings into a database string/meta-data tuple using datatype (un)folding operations.

As described in further detail herein, implementations of the present disclosure provide a transparent layer between the application and the database that guarantees that no existing taint information is lost through information storage, and that all persisted taint information is restored when the corresponding string data is read from the database.

FIG. 1 depicts an example architecture 100 in accordance with implementations of the present disclosure. In the depicted example, the example architecture 100 includes one or more client devices 102, 104, a network 106, and a server system 108. The server system 108 includes one or more server devices and databases (e.g., processors, memory). In the depicted example, respective users 112, 114 interact with the client devices 102, 104. In an example context, the users 112, 114 can include software developers, who interact with a SCM tool hosted by the server system 108 to develop software projects (also referred to herein as projects).

In some examples, the client devices 102, 104 can communicate with the server system 108 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 108 includes at least one server and at least one data store. In the example of FIG. 1, the server system 108 is intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

As introduced above, implementations of the present disclosure provide a transparent layer between the application and the database that guarantees that no existing taint information is lost through information storage, and that all persisted taint information is restored when the corresponding string data is read from the database. More particularly, implementations of the present disclosure provide run-time rewriting of SQL statements provided by a taint-aware application. The SQL-to-SQL rewriting enables processing of the taint information alongside of the actual data.

In some implementations, the database layout is adapted to store additional taint information, as described in further detail herein. Whenever a SQL statement is composed to be sent to the database connector, the SQL statement is intercepted for rewriting, as also described in further detail herein. Rewriting of the SQL statement is performed using transparent API wrappers, which enables existing applications to be provisioned with taint protection without requiring any changes to the application's source code.

Figure 2:
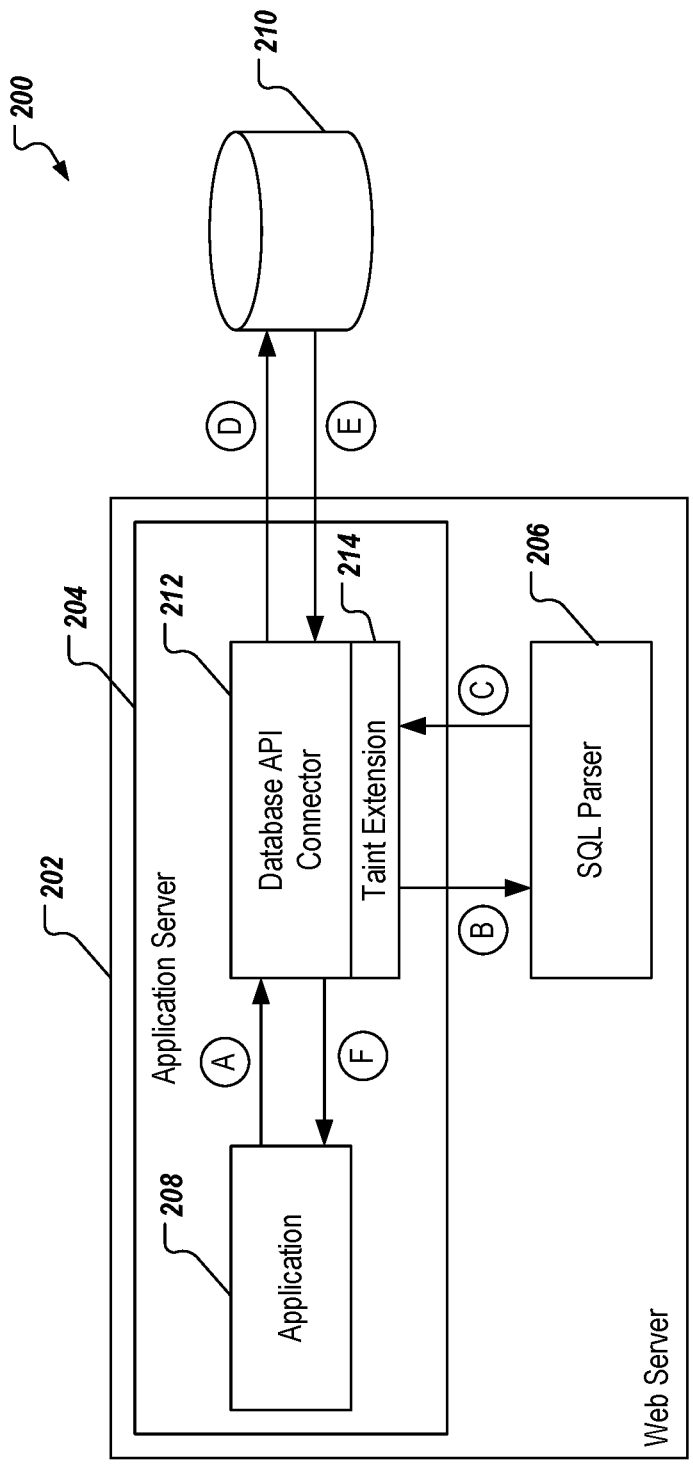
FIG. 2 depicts an example conceptual architecture in accordance with implementations of the present disclosure.

FIG. 2 depicts an example conceptual architecture 200 in accordance with implementations of the present disclosure. The example conceptual architecture 200 includes a web server 202 that hosts an application server 204, and a SQL parser 206. The application server 204 executes an application 208 that stores data to, and retrieves data from a database 210 through a database API connector 212. In accordance with implementations of the present disclosure, the application 208 is taint-aware to associated taint information with data processed by the application, and the database API connector 212 includes a taint extension 214 for communication with the SQL parser 206, as described in further detail herein.

In some implementations, the application 208 creates a SQL request, and passes (A) the SQL request to the database API connector 212. The taint extension 214 sends (B) the SQL request to the SQL parser 206. The SQL parser 206 returns (C) a structural representation of the SQL request for further processing to the taint extension 214. The taint extension 214 adds SQL code, which stores the taint information alongside the actual data to the preprocessed SQL statement, and reserializes the statement to provide an enhanced SQL statement. The enhanced SQL statement is sent to the database 210. The database 210 processes the enhanced SQL statement (SQL query), and returns (E) a query result. The query result is processed by the taint extension, which combines any contained taint meta-data with the corresponding string values. The resulting table structures are returned (F) to the application 208.

In some implementations, taint information is only maintained for string values. In view of this, to realize taint persistence, capabilities are added to the database 210 that, for each stored string value, the corresponding taint meta-data is persisted as well. In the context of present disclosure, it is provided that strings are stored in the database 208 using the database's column type var. char. An adaption of other database column types using the same approach can be achieved, but are omitted from the present disclosure for the sake of brevity.

FIGS. 3A-3C depict example strategies for persisting taint information into relational databases.

FIG. 3A depicts the use of shadow columns. For example, for each var char column, a shadow column is added that stores the taint information. In some examples, the name of the shadow column is chosen during the initialization of the table by the persistence system, such that is does not collided with any existing column names. FIG. 3B depicts dual datatypes within columns. More particularly, the taint information is stored inline with the actual values (e.g., the actual value and the taint information are separated by a terminator character). While this approach has the significant advantage of requiring no changes to the application's database layout, it might introduce problems with processing the values on the database level (e.g., when associating rows based on value comparison). FIG. 3C depicts the use of shadow tables. For example, a shadow table is added to the database table layout, and records the taint information. The shadow table mirrors the structure and relations of the respective original table.

Each of the example strategies of FIGS. 3A-3C has distinct advantages and disadvantages. Consequently, before introducing a particular strategy, the application developer should do a preliminary analysis of the application's specifics, and chose the most appropriate strategy. In the context of the present disclosure, and without limitation, the use shadow columns is provided as the selected persistence approach.

Implementations of the present disclosure provide on-the-fly SQL-to-SQL rewriting. In accordance with implementations of the present disclosure, taint tracking is implemented completely on the execution engine level, and is invisible to the actual code of the application. Consequently, applications require no changes when executed on a taint-aware platform. This implicitly results in the functional requirement that all database operations, which are part of an application should remain unchanged, as far as their handling in the original source code is concerned. In view of this, addition of the taint persisting functionality is realized in the database connector (e.g., the database connector 212 with the taint extension 214). With regard to SQL-to-SQL rewriting, a SQL query that has been passed to the database connector is altered, such that the enhanced SQL query also handles the taint information. In this manner, all queries that touch varchar columns also touch the corresponding shadow columns (i.e., the columns storing the taint information).

As described above with reference to FIG. 2, the taint extension 214 of the database connector API 212 maintains an interface to the SQL parser 206. Before handing the query over to the database 210, the query is first processed by the SQL parser 206. The SQL parser 206 is initiated with the database schema. In this manner, the SQL parser 206 has precise information about the assigned datatypes of the columns of the database tables. In some examples, the SQL parser 206 transforms the SQL query into a parse tree, which enables the tables and columns that are affected by the SQL query to be determined. The tree-like structure of the SQL query provides the actual column-names in the form of end-nodes. In view of this, rewriting can include adding further column-names, and, in the case of write operations, values. For example, the column-names and values are added to the tree as child-nodes of the same ancestor-node, which already has the links to the original varchar nodes. The revised parse tree (with added child nodes) is re-serialized in a character-based SQL representation of the query to provide an enhanced SQL query, which is passed to the database engine for execution.

Figure 4A:
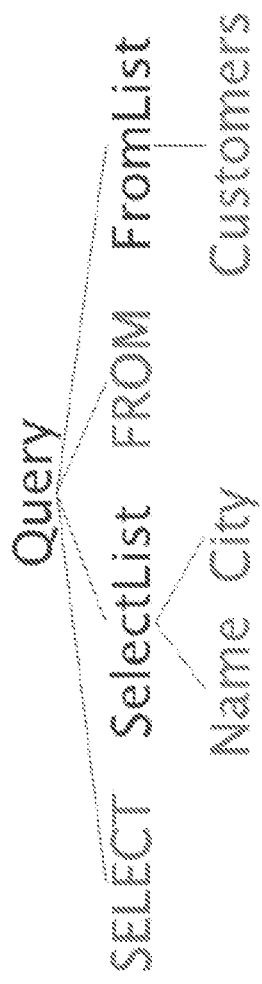
FIGS. 4A and 4B depict example parse trees of an example SELECT statement, and an example taint-aware SELECT statement, respectively.
Figure 4B:
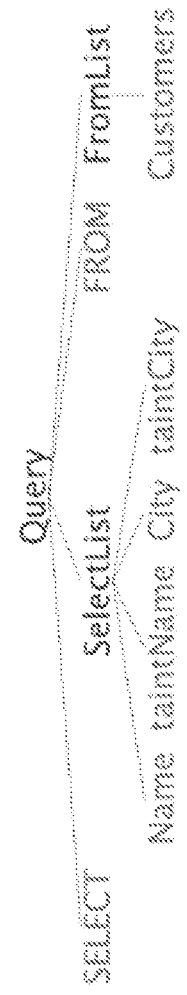

FIGS. 4A and 4B illustrate the above-described approach. In the example of FIG. 4A, the names of the columns "Name" and "City," from which the data of the SELECT query is read, are child nodes of the SelectList node in the parse tree. In the example of FIG. 4B, in the generated parse tree of corresponding enhanced (taint-enhanced) query, the column names for the taint values ("taintName" and "taintCity") are inserted into the parse tree as child nodes of the same ancestor.

Figure 5A:
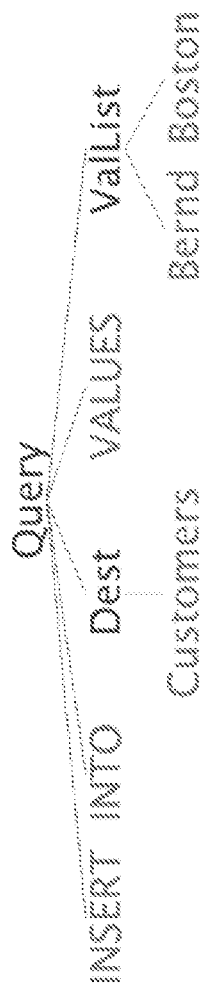
FIGS. 5A and 5B depict example parse trees of an example INSERT statement, and an example taint-aware INSERT statement, respectively.
Figure 5B:
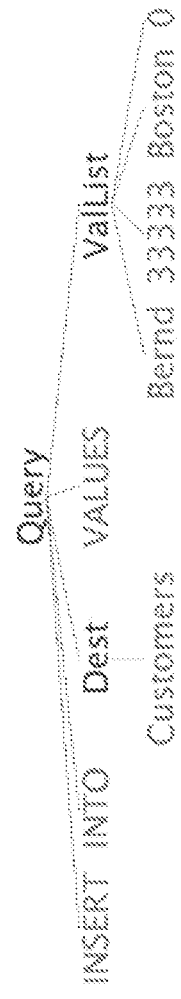

With regard to taint-enhanced read queries, in case of reading data from the database, for each column referenced in the SELECT statement, the corresponding taint column is added to the column list within the query. No other portions of the query need to be adapted. Also, in case a full row is queries, using a wildcard character (e.g., *), no changes to the query need be made. Listing 1, below, in view of FIG. 4A provides an example query before rewriting, and Listing 2, below, in view of FIG. 4B provides an example for the same query after rewriting:

SELECT Name, City FROM Customers;
Listing 1: Original SQL SELECT statement
SELECT Name, taintName, City, taintCity FROM Customers;
Listing 2: Taint-aware SQL SELECT statement With regard to writing data to the database, two SQL operations are considered: INSERT and UPDATE. In both cases, the original query is extended at two places for each taint-carrying value: in the list of column-names and in the list of actual values. Listing 3, below, in view of FIG. 5A, provides an example INSERT query before rewriting, and Listing 4, below, in view of FIG. 5B provides an example of the same query after rewriting process. The rewriting process for UPDATE queries is analogous.

INSERT INTO Customers VALUES ('Bernd', 'Boston');
Listing 3: Original SQL INSERT statement
INSERT INTO Customers VALUES ('Bernd', '33333', 'Boston', '0');
Listing 4: Taint-aware SQL INSERT statement In some implementations, SQL queries that alter the database layout are also be adapted. Here, the queries are expanded, such that, for each VARCHAR column, an additional column is introduced, that holds the taint information for the column. Relevant SQL operations in this context are ALTER TABLE and CREATE TABLE. The rewriting process is identical to the process for SELECT operations, described herein.

In some implementations, the database connector receives the SQL query in the form of a string value, pass the string value to the database, and receive a query result in the form of either a status (in case of write operations), or table rows (in case of read operations). To practically realize persistence of taint information, implementations of the present disclosure leverage datatype un-/folding and API wrapping.

With regard to data un-/folding, in the application's runtime, the string value, and its taint meta-data are contained in a single datatype. On the database level, these are split over two columns (e.g., original column, shadow column). Accordingly, the data is divided (unfold) and merged (fold) during the database operations.

In some examples, write operations include datatype unfolding. For example, a given SQL query that is created during run-time, exists in the form of a string. All data values of this string potentially carry taint meta-data. Before passing the data to the database, the taint information is separated from the actual string data, and is transformed into a datatype that can be persisted in the database. For purposes of non-limiting illustration, the present disclosure assumes that taint information is maintained as a sequence of integers (as seen in the Example Taint-aware String above). Depending on an application's concrete security requirements, taint information can be of any appropriate form. After unfolding, two representations exist for each data item: the actual value and the taint information. These two values are subsequently inserted into the SQL query after parsing, as described in further detail herein.

In some examples, read operations include datatype folding. For example, when data-carrying string information is read from the database, the taint-enhanced value is split over two columns. Before it is passed back to the application, the two columns are merged and the plain string is transformed into a taint-aware string. In some examples, this is achieved by table record-to-record datatype folding. The table record is iterated and all connected value/taint elements are merged into a single taint-aware string type. The superficial taint column is deleted from the record. The details on merging are derived from the table layout and the column names (e.g., values from the column [colname] are folded together with the taint information from the column [taintColname]).

In some implementations, API wrapping is used to provide for transparent SQL rewriting. More particularly, runtime modification of APIs are provided, which modification maintains an API's signature (e.g., the number and types of parameters and return values), while modifying the functionality. API wrappers maintain the original API as an internal reference in their implementation, and can be called when needed. In this manner, an API wrapper can realize pre- and post-processing steps on an API's parameters, before the actual API is called.

In accordance with implementations of the present disclosure, the API extracts the SQL query (in string form) from the API call, and passes the SQL query string to the SQL parser. The API receives the rewritten, taint-enhanced SQL query from the SQL parser. In the case of write operations, the API unfolds all string values to separate data and taint information, and inserts the taint information back into the parsed SQL query. The API re-serializes the SQL query into a string query and passes it to the original database connector. The API receives the query result from the database. In the case of read operations, the API folds all string values with their taint information counterparts, and returns the query result to the application. In this manner, connecting to the database does not change for the application, as all taint-processing changes are done within the API wrapper.

Figure 6:
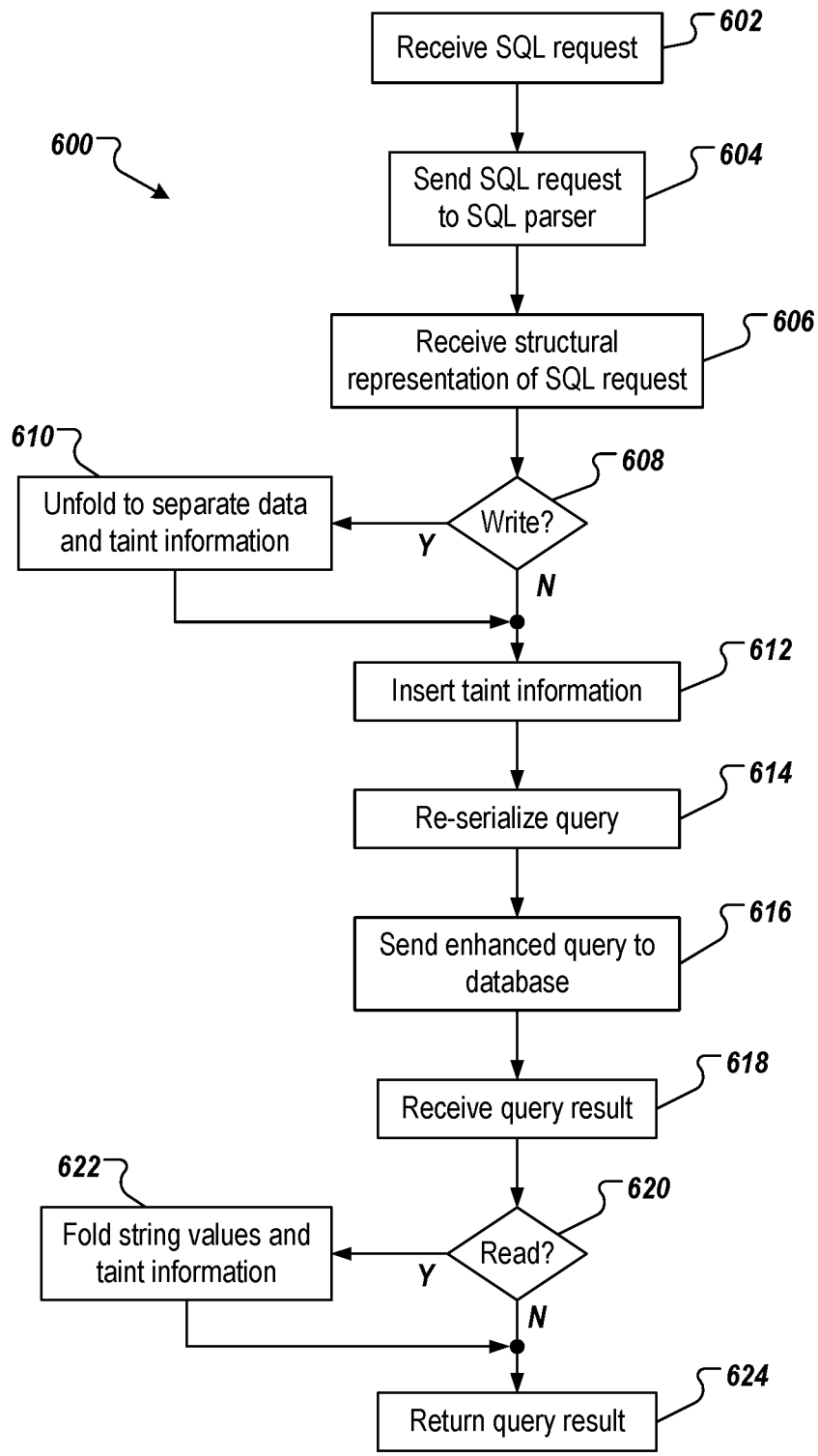
FIG. 6 depicts an example process that can be executed in accordance with implementations of the present disclosure.

FIG. 6 depicts an example process 600 that can be executed in accordance with implementations of the present disclosure. In some examples, the example process 600 is provided using one or more computer-executable programs executed by one or more computing devices.

A SQL request is received (602). For example, and as described above with reference to FIG. 2, the application 208 creates a SQL request, and passes the SQL request to the database API connector 212, which receives the SQL request. In some examples, the database API connector 212 receives an API call from the application 208, and extracts the SQL request therefrom. The SQL request is sent to a SQL parser (604). For example, the taint extension 214 sends the SQL request (string) to the SQL parser 206. A structural representation of the SQL request is received (606). For example, the taint extension 214 receives the structural representation of the SQL request (e.g., rewritten SQL query) from the SQL parser 206.

It is determined whether the SQL request includes a write operation (e.g., INSERT, UPDATE) (608). If the SQL request includes a write operation, unfolding is performed to separate the data from the taint information (610). If the SQL request does not include a write operation, taint information is inserted into the SQL query (612). The SQL query is re-serialized to provide an enhanced SQL query (614). For example, the taint extension 214 adds SQL code, which stores the taint information alongside the actual data to the preprocessed SQL query, and reserializes the statement to provide the enhanced SQL query. The enhanced SQL statement is sent to the database (616). A query result is received (618). For example, the database 210 processes the enhanced SQL query, and returns the query result to the database API connector 212.

It is determined whether a read operation (e.g., SELECT) was included in the SQL query (620). If a read operation was present, folding of the strong values, and the taint information is performed, as described herein. For example, the query result is processed by the taint extension 214, which combines any contained taint information with the corresponding string values. The query result (e.g., table structures) are returned to the application (624).

Figure 7:
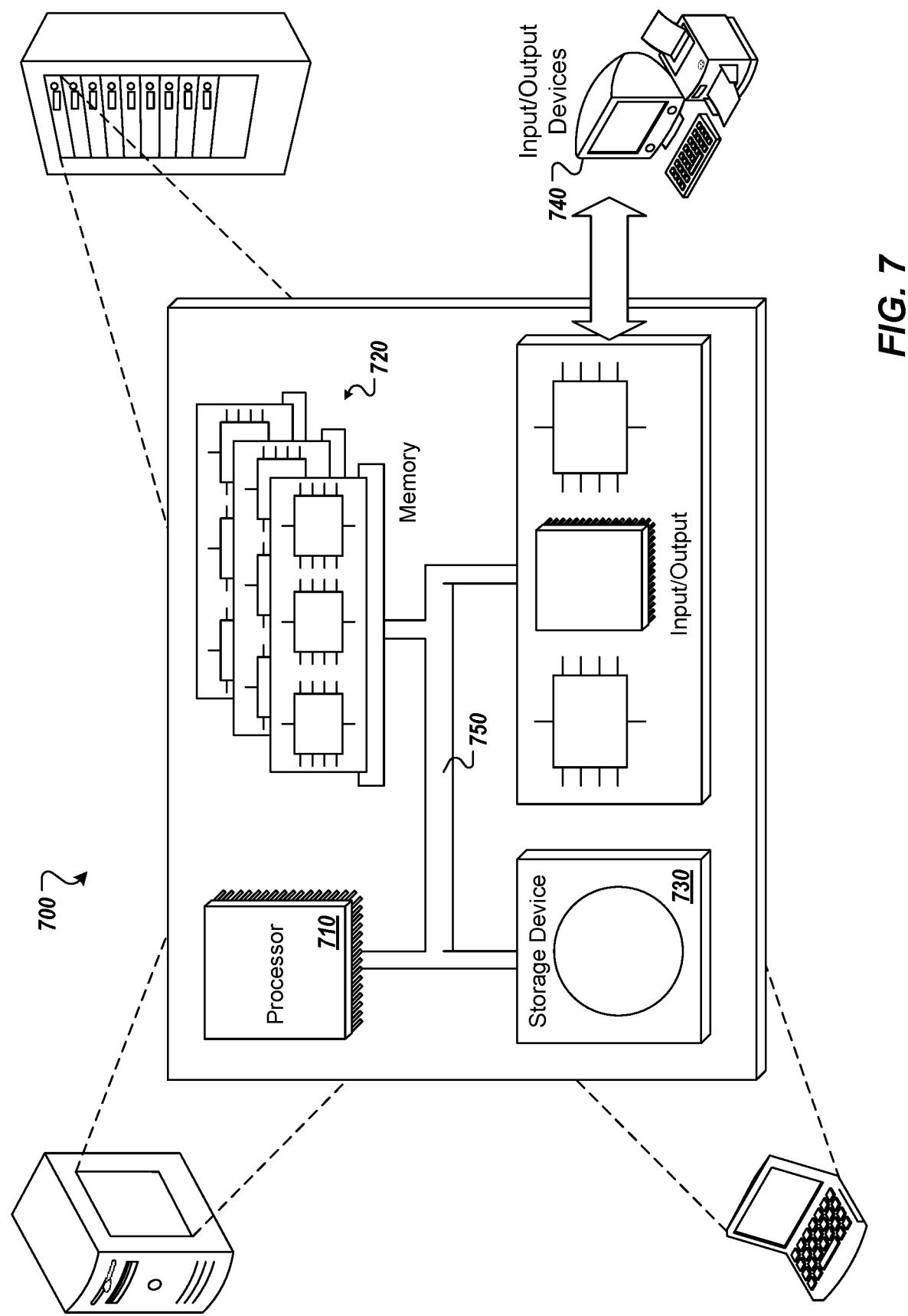
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. In some implementations, the memory 720 is a volatile memory unit. In some implementations, the memory 720 is a non-volatile memory unit. The storage device 730 is capable of providing mass storage for the system 700. In some implementations, the storage device 730 is a computer-readable medium. In some implementations, the storage device 730 may be a floppy disk device, a hard disk device, an optical disk device, or a tape device. The input/output device 740 provides input/output operations for the system 700. In some implementations, the input/output device 740 includes a keyboard and/or pointing device. In some implementations, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for persisting taint information, the method being executed by one or more processors and comprising:

receiving, by a database connector having a taint extension, a SQL request in string form from an application, the application being taint-aware to associate taint information with data processed by the application, the database connector provided within an application server that executes the application and enabling communication between the application and a database that is external to the application server, the taint extension provided as a wrapper to the database connector and exclusively executing taint-processing changes in response to received SQL requests;

sending, by the taint extension, the SQL request to a SQL parser, the SQL parser executing external to the application server and the taint extension maintaining an interface to the SQL parser;

receiving, by the taint extension, a structural representation of the SQL request from the SQL parser, the structural representation of the SQL request comprising a parse tree transformed from the SQL request and taint information corresponding to data within the SQL request, the taint information being inserted as child nodes of the parse tree by the SQL parser, each child node having a same ancestor node as child nodes of respective data within the parse tree;

rewriting, by the taint extension, the SQL request based on the structural representation of the SQL request to provide an enhanced SQL statement in string form by adding taint information corresponding to data within the SQL request and maintain maintain a signature in the SQL request;

transmitting, by the database connector, the enhanced SQL statement to the database for storing the taint information with the data;

receiving, by the database connector, a query result;

processing, by the taint extension, the query result to combine taint meta-data with one or more string values to provide a taint-aware query result; and returning the taint-aware query result to the application.

2. The method of claim 1, wherein the SQL request comprises a write statement, and in response, unfolding is performed to separate the data and the taint information.

3. The method of claim 1, wherein the SQL request comprises a read statement, and in response, folding is performed to combine the data and the taint information.

4. The method of claim 1, wherein the taint extension reserializes the data and the taint information to provide the enhanced SQL query.

5. The method of claim 1, wherein the taint information is stored within one of shadow tables, and shadow columns within the database.

6. The method of claim 1, wherein the database connector comprises an application programming interface (API).

7. A non-transitory computer-readable storage medium coupled to one or more processors and having instructions stored thereon which, when executed by the one or more processors, cause the one or more processors to perform operations for persisting taint information, the operations comprising:

receiving, by a database connector having a taint extension, a SQL request in string form from an application, the application being taint-aware to associate taint information with data processed by the application, the database connector provided within an application server that executes the application and enabling communication between the application and a database that is external to the application server, the taint extension provided as a wrapper to the database connector and exclusively executing taint-processing changes in response to received SQL requests;

sending, by the taint extension, the SQL request to a SQL parser, the SQL parser executing external to the application server and the taint extension maintaining an interface to the SQL parser;

receiving, by the taint extension, a structural representation of the SQL request from the SQL parser, the structural representation of the SQL request comprising a parse tree transformed from the SQL request and taint information corresponding to data within the SQL request, the taint information being inserted as child nodes of the parse tree by the SQL parser, each child node having a same ancestor node as child nodes of respective data within the parse tree;

rewriting, by the taint extension, the SQL request based on the structural representation of the SQL request to provide an enhanced SQL statement in string form by adding taint information corresponding to data within the SQL request and maintain maintain a signature in the SQL request;

transmitting, by the database connector, the enhanced SQL statement to the database for storing the taint information with the data, receiving, by the database connector, a query result;

processing, by the taint extension, the query result to combine taint meta-data with one or more string values to provide a taint-aware query result; and returning the taint-aware query result to the application.

8. The computer-readable storage medium of claim 7, wherein the SQL request comprises a write statement, and in response, unfolding is performed to separate the data and the taint information.

9. The computer-readable storage medium of claim 7, wherein the SQL request comprises a read statement, and in response, folding is performed to combine the data and the taint information.

10. The computer-readable storage medium of claim 7, wherein the taint extension reserializes the data and the taint information to provide the enhanced SQL query.

11. The computer-readable storage medium of claim 7, wherein the taint information is stored within one of shadow tables, and shadow columns within the database.

12. The computer-readable storage medium of claim 7, wherein the database connector comprises an application programming interface (API).

13. A system, comprising:

a computing device; and a computer-readable storage device coupled to the computing device and having instructions stored thereon which, when executed by the computing device, cause the computing device to perform operations for persisting taint information, the operations comprising:

receiving, by a database connector having a taint extension, a SQL request in string form from an application, the application being taint-aware to associate taint information with data processed by the application, the database connector provided within an application server that executes the application and enabling communication between the application and a database that is external to the application server, the taint extension provided as a wrapper to the database connector and exclusively executing taint-processing changes in response to received SQL requests;

sending, by the taint extension, the SQL request to a SQL parser, the SQL parser executing external to the application server and the taint extension maintaining an interface to the SQL parser;

receiving, by the taint extension, a structural representation of the SQL request from the SQL parser, the structural representation of the SQL request comprising a parse tree transformed from the SQL request and taint information corresponding to data within the SQL request, the taint information being inserted as child nodes of the parse tree by the SQL parser, each child node having a same ancestor node as child nodes of respective data within the parse tree;

rewriting, by the taint extension, the SQL request based on the structural representation of the SQL request to provide an enhanced SQL statement in string form by adding taint information corresponding to data within the SQL request and maintain a signature in the SQL request;

transmitting, by the database connector, the enhanced SQL statement to the database for storing the taint information with the data;

receiving, by the database connector, a query result;

processing, by the taint extension, the query result to combine taint meta-data with one or more string values to provide a taint-aware query result; and returning the taint-aware query result to the application.

14. The system of claim 13, wherein the SQL request comprises a write statement, and in response, unfolding is performed to separate the data and the taint information.

15. The system of claim 13, wherein the SQL request comprises a read statement, and in response, folding is performed to combine the data and the taint information.

16. The system of claim 13, wherein the taint extension reserializes the data and the taint information to provide the enhanced SQL query.

17. The system of claim 13, wherein the taint information is stored within one of shadow tables, and shadow columns within the database.

* * * * *